Patented Nov. 21, 1939

2,180,906

UNITED STATES PATENT OFFICE 2,180,906

RUBBER COMPOUND AND PROCESS OF MAKING SAME

Frederick J. Maywald and Frederick J. Maywald, Jr., Rutherford, N. J.; Eleanor A. Maywald, executrix of said Frederick J. Maywald, deceased, assignors to Maywald-Fleming Patents Company, a corporation of New Jersey No Drawing. Application May 4, 1936, Serial No. 77,808

11 Claims. (Cl. 260—747)

This case is a continuation in part of, and is substituted for, application Serial No. 664,044, filed April 1, 1933.

This invention relates to a rubber compound and a process of making same. The invention more particularly relates to a rubber compound suitable for cleaning and polishing materials, insoles, outsoles, and heels for shoes, rubbers, and boots for ordinary and sporting wear, belting, flooring, etc.

An object of the invention is to provide a tough, dense rubber compound having incorporated therein fibers of spinable length, the compound being substantially free of clots.

Another object is to provide a rubber compound which may be sewn, nailed, or cemented to another surface, and which will retain the stitches and nails indefinitely.

A still further object is to provide a non-skid rubber compound.

It is known to add flox to a rubber compound as a filler. Flox is obtained by grinding the waste screenings from silk, wool, cotton, rayon, and other fibers in their purification, and also from the waste obtained in the production of shoddies. Such flox is composed of very short fibers of 3/16" (5 mm.) or less in length.

If fiber is added to ordinary rubber stock on the mill, the fibers will clot or felt into lumps, and it is practically impossible to free the stock from such lumps. Continued milling to remove such lumps causes the fibers to be ground to a powder which becomes substantially ordinary flox filler.

We have now discovered that improved rubber products, having hitherto unknown properties, may be prepared by incorporating an oily body and fibers of silk, wool, cotton, flax, hemp, jute, ramie, rayon, etc., or mixture of the same, of substantially greater length than 3/16" (i. e., of "spinable" length) into rubber compounds, and curing the same. The oily body may be a liquid or semi-liquid oil, such as paraffin oil, mineral oil, cottonseed oil, corn oil, oleic acid, etc. The oily body is added in amount in excess of the usual compounding amounts as softeners, etc., and appears to lubricate the fibers from being ground. Generally the amount of oily body is varied as the amount of fiber varies. Thereby, the oily fibers disperse evenly through the compound during milling.

Preferred results are obtained with wool fibers, either scoured or unscoured, in their natural or untwisted condition and non-fabric form. Preferably scoured wool fibers are used as they do not discolor the rubber compound, and give a better product than the unscoured wool. As little as 2% on the rubber of fiber gives a binding action and ties down the stock. As high as 75% on the rubber may be used; a greater fiber content tends to give an unsatisfactory commercial article.

We have obtained good results with the following formulae:

| | Parts |
|---|---|
| Rubber | 400 |
| Carbon black | 50 |
| Oily body | 25 |
| Petrolatum | 25 |
| Stearic acid | 4 |
| Antioxidant (Neozone) | 5 |
| Zinc oxide | 20 |
| Accelerator (Tuads) | 2 |
| Sulphur | 15 |
| Wool or other fibers of spinable length and texture | 100 |

| | Parts |
|---|---|
| Rubber | 400 |
| Vaseline | 50 |
| Antioxidant (Neozone) | 6 |
| Accelerator (Thionex) | 1 |
| Zinc oxide | 20 |
| Sulphur | 17 |
| Oleic acid | 50 |
| Wool or other fibers of spinable length and texture | 100 |

The rubber is first thoroughly broken down and the carbon black, petrolatum, stearic acid, antioxidant, zinc oxide, Tuads, and sulphur added. After thoroughly mixing, the fibers are gradually added to the stock in small amounts, while the oily body is poured over the fibers. With such procedure, the fibers do not clot or felt, but freely enter into the compound without being broken down into shorter lengths. The oily body lubricates the fibers and prevents them from clotting or felting in the rubber, and also prevents them from being ground to a fine powder. The oiled fibers appear to slide through the rubber stock during the milling process. After all of the fibers and oily body have been added, the stock is milled for a short time to effect thorough incorporation. Any milling machine including the regulation rubber mill with odd speed rolls and the Banbury mill which has no rolls may be used. It is then cured in any well known manner, preferably at about 310° F. for about 10 minutes.

The fibers are present as long fibers, and not as finely divided powder or flox. They act as binding agents and tie the stock down, substantially preventing flow on the mill or in the cure. Apparently the rubber enters into the pores of the fiber, and becomes anchored and combined, giving additional strength to the product.

The rubber product may be soft, semi-hard, or hard. The hardness of the product may be increased by increasing the amount of sulphur used, or by substituting silk, cotton, rayon, ramie, or other fiber in place of the wool mentioned in the formula.

The nature and amount of oily body, accelerator, and antioxidant may be varied according to common practice. The antioxidant and/or accelerator may be omitted, but modern rubber practice indicates the use of both. If desired, the fibers can be oiled before milling in, and allowance made for this by decreasing the amount of oil milled in.

The cured rubber may be cut or molded into any desired shape. In molding, the cured rubber is cut to a width less than the width of the mold cavity, but of greater thickness, so that compression in the press forces the rubber to the edges of the mold. If this is not done, imperfectly formed articles result, due to the slight flowing property of the fiberized rubber. Such rubber molds with extreme sharpness and will follow every line and curve in a mold with the same clearness as does celluloid, phenol resin products, such as Bakelite, etc. There is practically no overflow of rubber because if too much stock is used in the mold it cannot be completely closed. Curing and molding may also be effected in one operation.

The smooth surface of the rubber compound may be buffed in any well known manner, as by means of a buffing wheel. Such buffing removes the smooth surface, exposing some of the fibers, and gives a non-skid surface even on ice or wet or highly polished surfaces. The buffed product has a velvety appearance and feel.

The rubber product is solid, dense, tough, and water-proof, and substantially free of clots. It may be used for cleaning and polishing materials, insoles, outsoles, and heels for shoes, rubbers, and boots for ordinary and sporting wear, belting, flooring, etc. The non-skid product is very suitable for a sole and/or heel for shoes, rubbers, and boots, and especially for sporting wear, as for example in boots for fishing purposes, etc. The rubber can also be molded into various articles which are now produced from Bakelite or other resins and can be colored as desired.

Rubber products according to this invention may be sewn or nailed to other materials, and will retain the stitches or nails indefinitely. The threads do not tend to pull through the rubber compound, either immediately or upon wear, and a cementing agent is not required, as is customary, for example, in ordinary rubber soles and heels.

Ordinary fibers, when exposed to dry heat of 250° F. and above, will char or deteriorate, but in the present process, curing temperatures of higher than 310° F. may be used without injuring or breaking down the fiber.

We are aware, as evidenced by United States Patent No. 836,068 to Frederick M. Ekert, issued November 13, 1906, that it has been previously proposed to incorporate fibers of asbestos into rubber by quickly passing the asbestos, in a dry state, and rubber which has previously been broken down on a mill, between rolls driven at equal speeds, whereby the asbestos is pressed or queezed into the rubber. The asbestos when subject to such pressing or squeezing action, however, becomes hard and brittle and the individual fibers assume a general parallelism one with another. The asbestos-rubber product of the Ekert patent is thus in no wise comparable to our organic fiber-rubber compound wherein the fibers, which are of "spinable" length, are mixed in all and random directions throughout the mass and are maintained in their original soft, flocculent, pliable, and unbroken condition.

We are also aware, as evidenced by United States Patent No. 1,884,106 to Edward J. Moran, issued October 25, 1932, that rubber compounds having hog-bristles up to 1¼" in length incorporated therein, are known. The coarse hair or bristles lie substantially parallel with one another so that the product has very little elasticity or stretch in the direction of the disposal of the hair. As previously set forth, the process of our invention assures a random distribution of the fibers so that the product is characterized by a degree of uniformity in elasticity not found in fiber-reinforced products wherein the fibers are disposed in general parallelism. It is further evident that the hog-bristles of the Moran patent are in their very nature, unpliable, coarse, and brittle and that such "fibers" will fracture and break when subject to strain, so that the compound is entirely unsuited for use in footwear or belting or other use involving more or less constant flexing.

We are not to be limited to any specific formula of reacting materials, accelerator, antioxidant, etc., nor to any method of compounding, curing, or molding the rubber, but intend to claim broadly our process and product in the appended claims.

We claim:

1. Process of making a rubber compound comprising milling fibers of substantially greater length than $\frac{3}{16}$" into rubber with an amount of oily lubricant sufficient to render the surfaces of said fibers slippery and in excess of the compounding amounts of oily material added as softeners to rubber, whereby said fibers are evenly distributed substantially unbroken throughout the rubber.

2. In a process as claimed in claim 1, the amount of oily lubricant being in excess of 6% on the rubber.

3. In a process as claimed in claim 1, the amount of oily lubricant being from approximately 6% to 25% on the rubber.

4. Process of making a rubber compound comprising milling fibers of spinable length and texture into rubber with an amount of oily lubricant sufficient to render the surfaces of said fibers slippery and in excess of the compounding amounts of oily material added as softeners to rubber, whereby said fibers are evenly distributed substantially unbroken throughout the rubber.

5. Process of making a rubber compound comprising breaking down rubber and mixing into the rubber an oily body as a softener, adding fibers with an additional amount of oily material as a lubricant for said fibers sufficient to render the surfaces of said fibers slippery, and milling the batch, whereby said fibers are evenly distributed substantially unbroken throughout the rubber.

6. Process of making a rubber compound comprising breaking down rubber mechanically and mixing into the rubber a semi-solid oily body as a softener, adding wool fibers with an amount of a liquid oily material as a lubricant for said fibers sufficient to render the surfaces of said fibers slippery, and milling the mixture, whereby said fibers are evenly distributed substantially unbroken through the rubber.

7. Process of making a rubber compound comprising milling flocculent organic fibers of substantially greater length than $\tfrac{3}{16}''$ into rubber with an amount of oily lubricant sufficient to render the surfaces of said fibers slippery and in excess of the compounding amounts added as softeners into the rubber, whereby said fibers are evenly distributed substantially unbroken through the rubber, curing the rubber, and buffing the cured rubber.

8. The process of making a rubber compound comprising milling from 2% to 75% on the rubber of substantially wool fibers of greater length than $\tfrac{3}{16}''$ into rubber stock with from approximately 6% to 25% of lubricating oil, the amount of lubricating oil being sufficient to render the surfaces of the fibers slippery, whereby the fibers are evenly distributed substantially unbroken through the rubber, curing the rubber, and buffing the cured rubber.

9. The process of making a rubber compound comprising milling substantially 100 parts of wool fibers with substantially 400 parts of rubber in the presence of substantially 50 parts of an oily lubricant, said lubricant rendering the surfaces of the fibers slippery, whereby the said fibers are evenly distributed substantially unbroken throughout the rubber.

10. A product substantially identical with that produced by the process defined in claim 1.

11. Process of incorporating fibers of spinable length and texture into rubber which comprises subjecting said fibers to an oily body of a type capable of rendering, and in a quantity sufficient to render, said fibers slipper, and milling said slippery fibers into the rubber.

FREDERICK J. MAYWALD.
FREDERICK J. MAYWALD, Jr.